(12) United States Patent
Cromwell

(10) Patent No.: US 7,849,521 B1
(45) Date of Patent: Dec. 14, 2010

(54) FINGERTIP MANIPULATION DEVICE FOR USE WITH GLOVES AND INSERTION DEVICE AND METHOD OF INSERTION

(76) Inventor: Lawrence Cromwell, 3648 Freshwater Dr., Jupiter, FL (US) 33477

( * ) Notice: Subject to any disclaimer, the term of this patent is extended or adjusted under 35 U.S.C. 154(b) by 952 days.

(21) Appl. No.: 11/714,580

(22) Filed: Mar. 6, 2007

Related U.S. Application Data

(60) Provisional application No. 60/793,786, filed on Apr. 21, 2006.

(51) Int. Cl.
*A41D 19/00* (2006.01)
(52) U.S. Cl. .......................................... 2/160; 345/156
(58) Field of Classification Search .................. 2/161.6, 2/160; 345/156, 179
See application file for complete search history.

(56) References Cited

U.S. PATENT DOCUMENTS

2004/0150616 A1* 8/2004 Murphy ....................... 345/156
2005/0231471 A1* 10/2005 Mallard et al. ............... 345/156
2006/0221066 A1* 10/2006 Cascella ...................... 345/179

* cited by examiner

*Primary Examiner*—Katherine Moran
(74) *Attorney, Agent, or Firm*—Gold & Rizvi, P.A.; H. John Rizvi; Glenn E. Gold

(57) ABSTRACT

A fingertip manipulation device is provided which gives the user the ability to manipulate items such as small controls on consumer electronic products while wearing gloves. The fingertip manipulation device includes a mounting disk that is placed inside a glove preferably at the fingertip, a projecting member extending substantially perpendicularly from the mounting disk and configured to extend through the glove material, and a tip that is attached on the exterior of the glove to the distal end of the perpendicular projecting member. A method of conveniently inserting the device into a glove fingertip, as well as an insertion device, is provided. While wearing gloves to protect the hands, the tip of the fingertip manipulation device is easily used to engage or manipulate switches, buttons, or items.

10 Claims, 4 Drawing Sheets

FIG. 7
FIG. 8
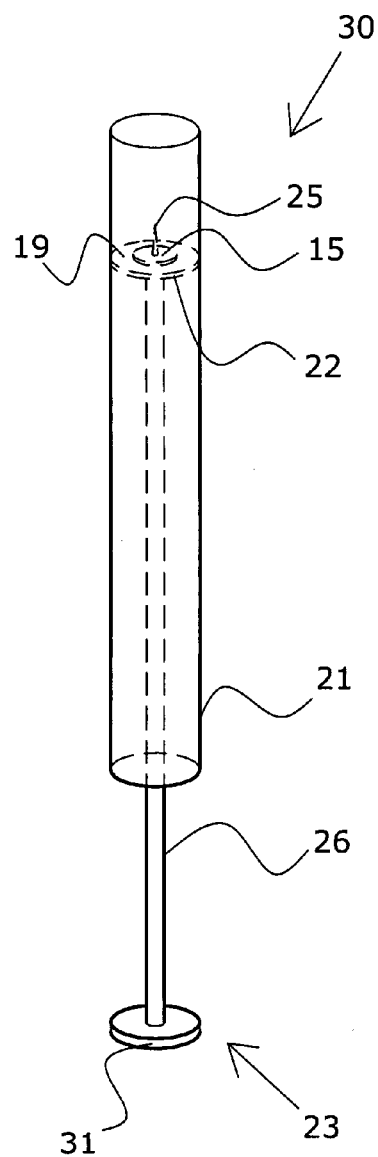
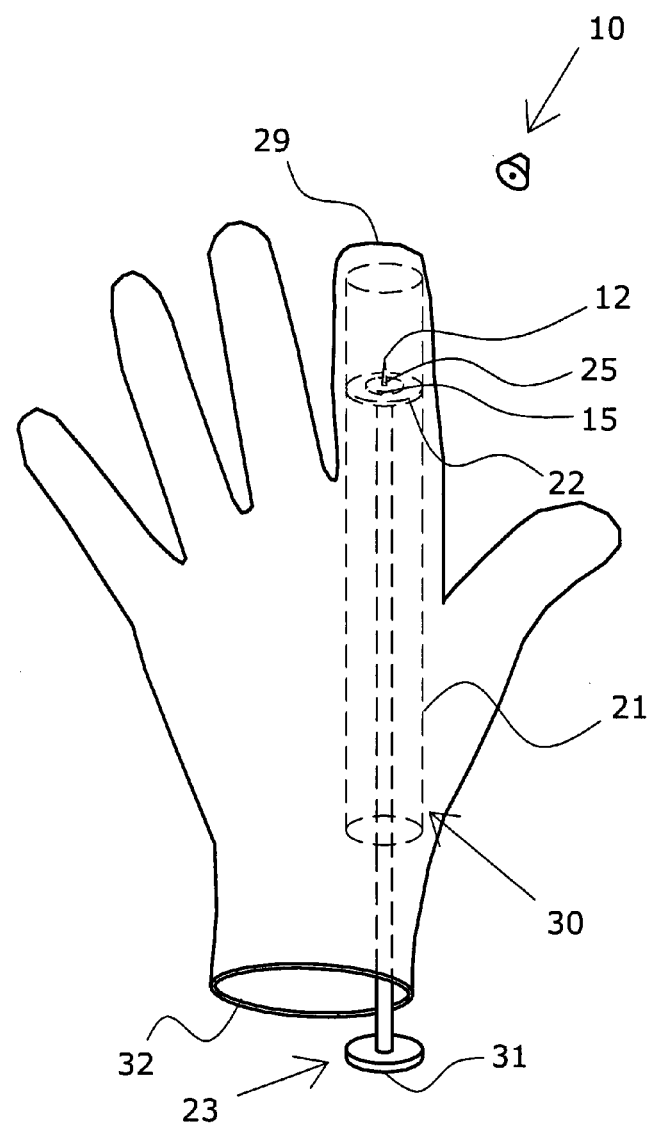

FINGERTIP MANIPULATION DEVICE FOR USE WITH GLOVES AND INSERTION DEVICE AND METHOD OF INSERTION

CROSS-REFERENCE TO RELATED APPLICATION

This application claims the benefit of U.S. Provisional Patent Application Ser. No. 60/793,786, filed on Apr. 21, 2006, which is incorporated herein in its entirety.

BACKGROUND OF THE INVENTION

1. Field of the Invention

The present invention relates generally to hand and finger attachments designed to facilitate the handling or manipulation of articles or material, and more particularly, to a fingertip manipulation device for use with gloves and the device and the method to attach the fingertip manipulation device to the glove.

2. Description of the Prior Art

Although various manipulation devices are known, most have been designed to assist those with limited muscular or neurological control of their fingers. These manipulation devices aid those having limited finger control with such tasks that are typically performed with fingers, such as dialing a phone, manipulating other controls on electronic devices, or turning pages of a book. These manipulation devices include pointing sticks and other movement focusing devices. These allow a user to execute typical finger-performed tasks by focusing a movement of the user's hands or arms onto a point or cone that engages or activates an element, thereby substituting for fingertip engagement. These are generally attached to the user's hands by means of straps around the hand and wrist that provide support for the manipulation device. These are generally unwieldy, unattractive, and cumbersome to attach to the hand, to wear and to use.

Some manipulation devices are designed to hold a tool in a position for utilization, which is needed either because of a handicap or because of a repetitive task that could damage the user's hand, for example holding an eating utensil or a pen.

Other manipulation devices include specialized tools that are attached to the hand or fingers to increase efficiency in a task while providing protection for the hand. For example, a tool for husking corn or a tool for pulling wire cable can be attached to the palm of the hand by securing straps, or a specialized rubber cover can be attached to the fingertip to be used to turn pages of a book or to count money.

None of the manipulation devices known are suitable for assisting a user in what has become a common situation in our digital age, the need to manipulate small buttons, controls, or objects while wearing gloves, for example dialing or answering a cell phone when outdoors on a winter day.

Consumers today usually own and operate a large number of consumer electronic devices on a daily basis. The need and desire to use these devices continues to grow astoundingly. The huge numbers of devices involved are exemplified by the 200 million cell phones owned by about 70% of the population of the U.S. (CTIA—the Wireless Association) Often the need arises to utilize these devices while wearing gloves to protect the hands from cold. The devices, in general, are operated by manipulating small controls, such as by turning small dials or by depressing or engaging numerous small buttons or keys, which are often located in very close proximity to each other. This task becomes impossible when gloves are being worn because the glove material prevents the user from accurately engaging the correct controls. The user generally is required to remove the glove to access the controls. This results in painful exposure to the cold or even potential health hazards, such as frostbite.

Since the available manipulation devices were never designed for such an application, they are totally unsuitable for the function, as well being unwieldy and cumbersome to attach and to use. Therefore there is a need for an easy-to-use, compact, attractive device to engage items such as controls on consumer electronic devices while wearing gloves.

SUMMARY OF THE INVENTION

The present invention is directed toward to an attractive, compact, easy to use fingertip manipulation device that gives the user the ability to manipulate items such as small controls on consumer electronic products while wearing gloves. The fingertip manipulation device includes a mounting disk that is placed inside a glove at the tip of a finger of the glove, a projecting member extending substantially perpendicularly from the mounting disk and configured to extend through the glove material, and a tip that is attached on the exterior of the glove to the distal end of the perpendicular projecting member via the engagement mechanism. A method of conveniently inserting the fingertip manipulation device into a glove fingertip, as well as an insertion device, is provided. While wearing gloves to protect the hands, the tip of the fingertip manipulation device is easily used to engage or manipulate switches, buttons, or items.

An object of the present invention is to provide a fingertip manipulation device that enables a user to engage, depress or otherwise manipulate items while wearing gloves to protect the hands.

Another object of the present invention is to provide an aesthetically pleasing fingertip manipulation device.

An additional object of the present invention is to provide a fingertip manipulation device that is simple to install into the glove.

Another object of the present invention is to provide a fingertip manipulation device that is easy and economical to manufacture.

A further object of the present invention is to provide a fingertip manipulation device that is easy to use.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 7 is a perspective view of the insertion device of a preferred embodiment of the present invention; and FIG. 8 is a perspective view of the insertion device and its utilization in a glove of a preferred embodiment of the present invention.

Like reference numerals refer to like parts throughout the several views of the drawings.

DETAILED DESCRIPTION OF THE PREFERRED EMBODIMENTS

Shown throughout the figures, the present invention is directed toward an attractive, easy to use fingertip manipulation device that gives the user the ability to engage, depress, or otherwise manipulate items such as the small controls of electronic products while wearing gloves to protect the hands. Additionally, a method for inserting the fingertip manipulation device into a glove fingertip, as well as an insertion and placement device, is provided.

Figure 1:
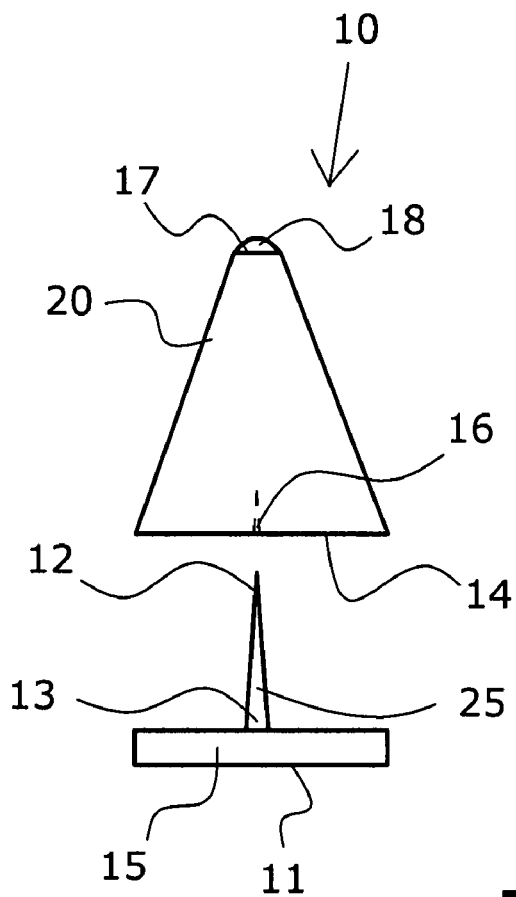
FIG. 1 is a side view showing a preferred embodiment of the fingertip manipulation device of the present invention.
Figure 2:
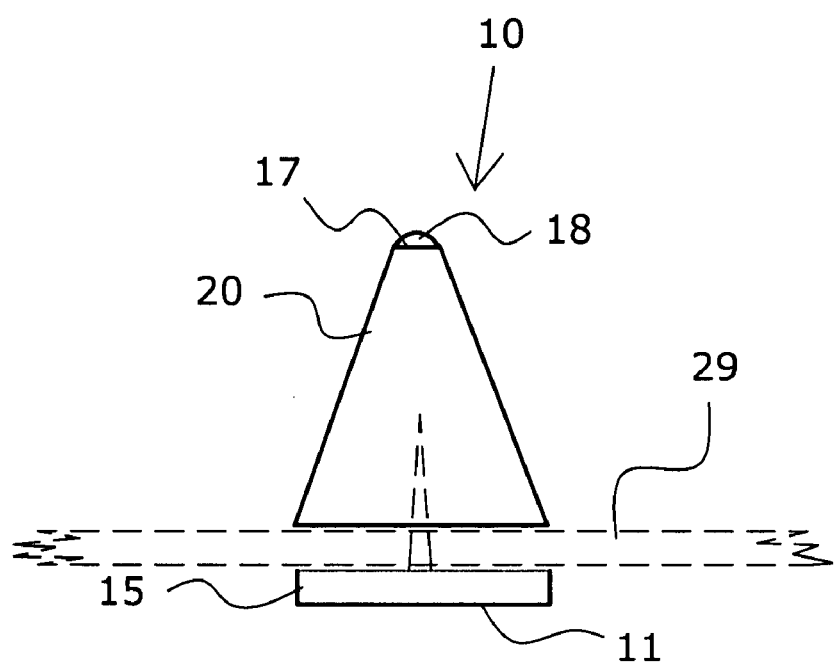
FIG. 2 is a side view of an application of a preferred embodiment of the fingertip manipulation device of the present invention showing the application to the fabric of a glove.

Referring to FIGS. 1-2, a fingertip manipulation device, shown generally as reference number 10, is illustrated in accordance with a first preferred embodiment of the present invention. As shown, the manipulation device includes a mounting disk 15, a projecting member 25 which is substantially perpendicular to mounting disk 15, and a tip 20 which is removably attachable to projecting member 25. The fingertip manipulation device is configured to be used with a glove 29 (best seen in FIG. 6, FIG. 8).

Figure 5:
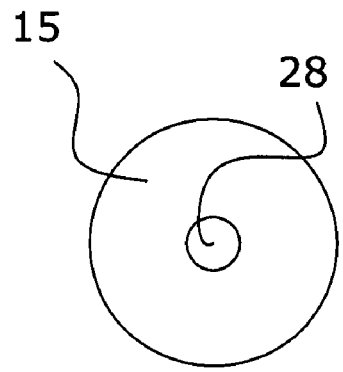
FIG. 5 is a top view of the mounting disk of a preferred embodiment of the fingertip manipulation device of the present invention.

Mounting disk 15 is generally a thin plate, which is preferably circular and flat, but can be somewhat cup shaped. When in use, mounting disk 15 is located inside glove 29, positioned at a fingertip. Projecting member 25, extending substantially perpendicularly from mounting disk 15, is preferably firmly and permanently attached to, or formed integrally with, a central location on mounting disk 15, as shown in FIG. 5. Projecting member 25 is preferably a slender rod-shaped rigid piece, with the proximal end securely attached to mounting disk 15 and with the distal end tapered and configured for insertion through the material of glove 29.

Projecting member 25 is configured with an attachment mechanism 12 on its distal end that enables it to easily be attached to tip 20. Tip 20 is generally shaped as a frustum cone or pyramid, having a flattened base or underside 14 and a flattened top portion or vertex 17. It is anticipated that vertex 17 is in a plane substantially parallel to the tip underside 14, although non-parallel planes are within the scope of the invention. Vertex 17 may have a small dome 18, either integrally formed as a part of tip 20 or secured to tip 20. The small dome 18 is sized and proportioned to enable the user of the fingertip manipulation device to engage, depress, or otherwise manipulate items such as small controls of electronic products or other small items.

Figure 4:
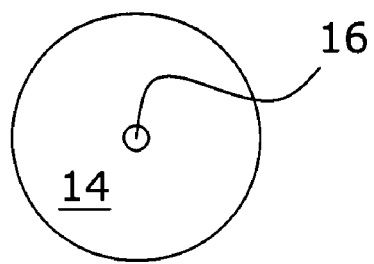
FIG. 4 is a bottom view of tip 20 of a preferred embodiment of the fingertip manipulation device of the present invention.

The attachment mechanism 12 can be any of a number of various attachment mechanisms as are known in the art. In FIGS. 1-2 a frictional connection is demonstrated where attachment mechanism 12 is configured as a sharp point that is pressed through the fabric of glove 29 and into tip underside 14. When using this mechanism of attachment, tip underside 14 is preferably designed with a small starter hole 16 in its center for ease of initiating the assembly of attachment mechanism 12 with tip 20, as shown in FIG. 4. Alternatively, other complementary attachment mechanism systems could be used, for example attachment mechanism 12 could include male screw threads and tip underside 14 could include complementary female screw threads extending upward into tip 20.

Figure 3:
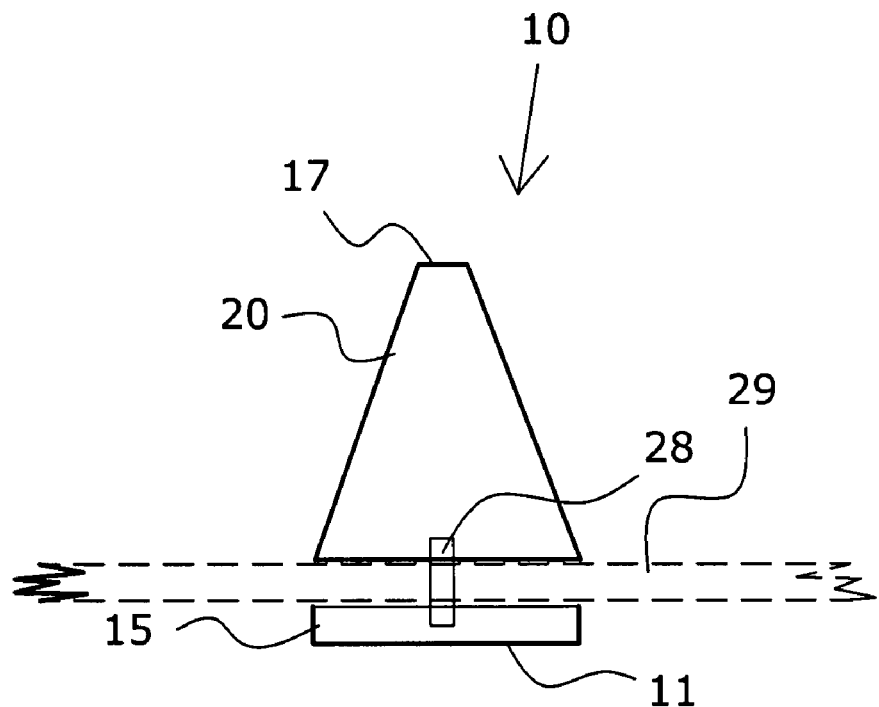
FIG. 3 is a side view of a second embodiment of the tip 20 of the fingertip manipulation device of the present invention.

FIG. 3 illustrates a second exemplary embodiment of the finger tip manipulation device of the present invention, which functions in a similar manner to the first embodiment but demonstrates two variations.

Whereas in the first exemplary embodiment, the small dome 18 is connected to, or formed integrally with, vertex 17, in the present second embodiment small dome 18 is omitted. Vertex 17 is sized and proportioned to enable the user of the fingertip manipulation device to engage, depress, or otherwise manipulate items such as small controls of electronic products or other small items. Vertex 17 is anticipated as being an approximately ⅛ inch circular or ellipsoidal plane.

Also in this present second embodiment, instead of tip 20 being removably attachable onto mounting disk 15 via projecting member 25, it is permanently attached to a similar extension member 28 through the fabric of the glove at the time of manufacture.

To aid in the placement and positioning of mounting disk 15 inside a fingertip of glove 29, provided is an insertion and placement device, a delivery wand 30, as shown in FIGS. 7-8. Delivery wand 30 has an exterior cylindrical housing 21 in which is located a moveable, slidingly engaged plunger 23. A shaft 26 of plunger 23 extends from user interface 31 to platform 22. Platform 22 is configured to allow a lower surface 11 of mounting disk to be positioned on, and temporarily attached to, the upper surface 19 of platform 22. Platform 22 may be coated with a weak adhesive to form the temporary attachment between platform 22 and lower surface 11 of mounting disk 15, or any other weak method of adhesion as is known in the art, such as complementary magnets, suction cups, or mechanical attachments, may be used.

Figure 6:
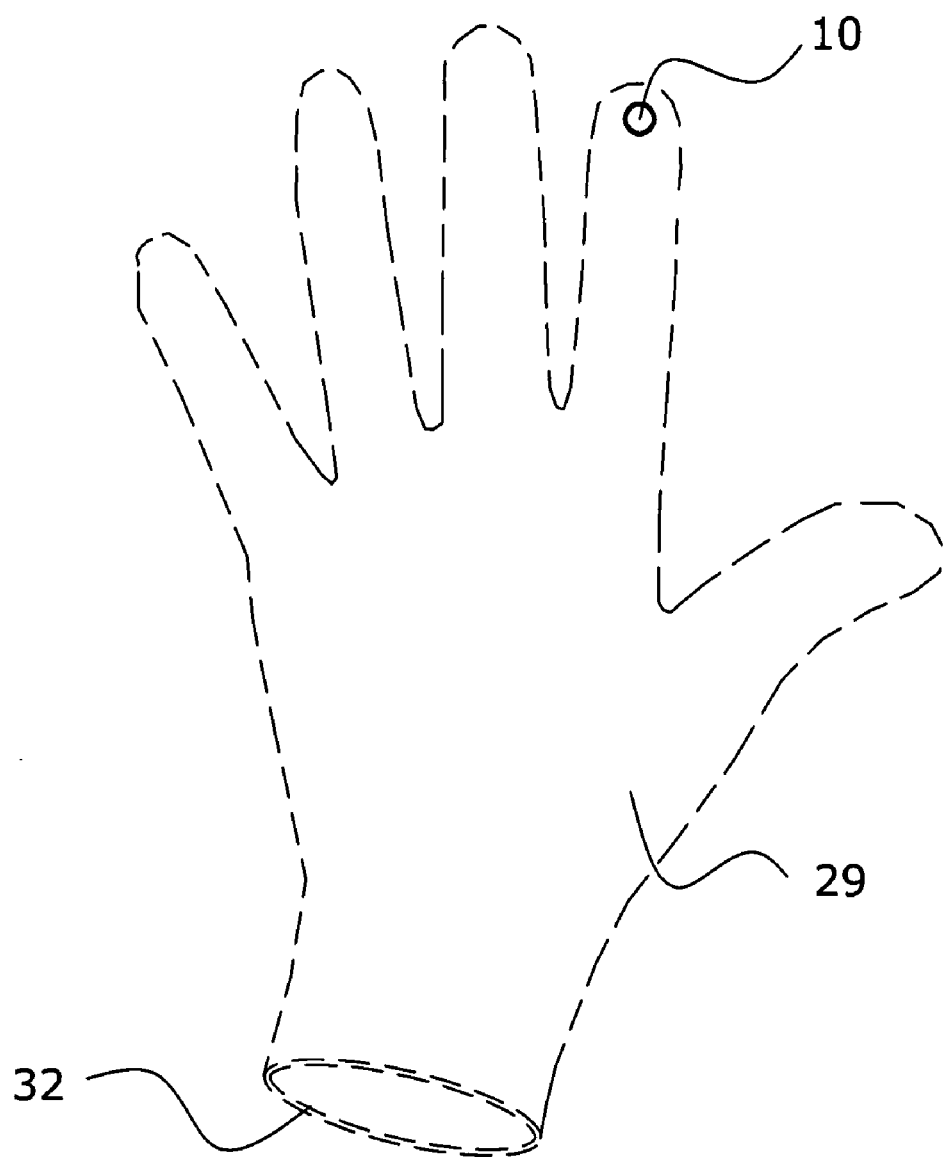
FIG. 6 is a view of an application of the fingertip manipulation device of the present invention in a glove.

Mounting disk 15 is first placed on the upper surface 19 of platform 22. Then platform 22, with attached mounting disk 15 connected to projecting member 25, is retracted by manually drawing platform 22 into cylindrical housing 21, as shown in FIG. 7. This enables mounting disk to be inserted into a finger of glove 29 without projecting member 25 engaging the fabric of glove 29 on the way to the desired position. As shown in FIG. 8, delivery wand 30 is inserted into a finger of glove 29, underneath the fabric that is at the position that is desired. The position of mounting disk 15 is chosen by the glove wearer in the location where he desires to have tip 20 with vertex 17. Often the desired position will be near the tip of the index finger, as illustrated in FIG. 6. The user next manually presses on user interface 31 to extend the plunger through cylindrical housing 21 thereby pushing the tapered end of projecting member 25 through the fabric of glove 29. The tapered end of projecting member 25 including attachment mechanism 12 now protrudes from the fabric of glove 29 fingertip. Next tip 20 is positioned over projecting member 25 and projecting member 25 is guided into small starter hole 16 and is frictionally engaged by tip 20 via forcible manual engagement of the two parts together, as shown in FIG. 2. Lower surface 11 of mounting disk 15 then disengages from the weak adhesive of platform 22, as delivery wand 30 is manually withdrawn from the glove. At this point the user inserts his or her hand into glove opening 32. With the fingertip manipulation device in use, the user can, while wearing gloves, accurately use vertex 17, or small dome 18 to manipulate small objects or to activate buttons that are in close proximity to each other. When dialing a cell phone, for example, this fingertip manipulation device will enable a user to easily depress the correct buttons without exposing his or her hands to the cold. More than one fingertip manipulation device can be used on different fingers of the glove, as desired. This might be helpful, for example, when grasping small objects between the index finger and the thumb.

The length of delivery wand 30 is sufficient to reach from the opening 32 of the glove 29 to the glove fingertip. A variety of sizes of delivery wand 30 can be provided for a variety of lengths, sizes, and designs of gloves 29. For example, an average size might be 7 inches long and ½ inch in diameter. It is anticipated that delivery wand 30 will be economically manufactured from plastic or some other suitably rigid material.

Mounting disk 15 is sized and proportioned to fit inside the finger of a glove 29 and to be comfortable against the fingertip. It is formed of any material with sufficient strength to support projecting member 25 with attached tip 20, for example of plastic or of metal. For example, mounting disk 15 might be a circular plate of approximately ⅜ inch in diameter and 1/32 inch in depth. In practice, mounting disk 15 may be in other geometric forms and may, for example, be oval-, octagonal-, or rectangular-shaped.

Projecting member 25 can be formed of any material that will provide sufficient strength to support and securely engage tip 20, such as, for example metal or plastic, but is anticipated as being formed of metal.

Tip 20 can be formed of any material that will provide sufficient strength to engage, depress, or manipulate items such as the controls of electronic devices, while additionally providing a secure attachment to projecting member 25. Preferably the surface would be a material that maximizes frictional forces when pressed against a smooth button or object. It is anticipated that tip 20 will be formed of a semi-rigid material such as rubber or a rubber-like material. Since tip 20 is the only part of the fingertip manipulation device that is visible outside the glove 29, tip 20 can be decorative or coordinated with the color or material of a user's outfit. A variety of styles and colors of tip 20 can be provided that will all attach to a single projecting member 25 of mounting disk 15, so the user choose a match for his or her gloves or outfit.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A manipulation device for use with gloves, comprising:
   a generally thin mounting disk configured to fit within a finger of said gloves, wherein said mounting disk is substantially flat;
   a substantially rigid, rod-shaped projecting member connected to said mounting disk and extending substantially perpendicularly from said mounting disk, said projecting member having a proximal end fixedly connected to said mounting disk and having a distal end configured to extend through the material of said gloves, wherein said projecting member is tapered;
   a generally frustum-shaped tip removably attachable to said distal end of said projecting member, said frustum-shaped tip having a flattened underside and having a flattened top vertex, wherein said frustum-shaped tip comprises a small dome securely connected to said flattened top vertex of said frustum-shaped tip, wherein said frustum-shaped tip is removably attachable to said mounting disk, and wherein said small dome is configured to manipulate small items; and
   an attachment mechanism configured to attach said projecting member to said frustum-shaped tip.

2. A manipulation device for use with gloves, as recited in claim 1, wherein said frustum-shaped tip is configured with a small starter hole disposed on said flattened underside, and wherein said attachment mechanism is configured as a sharp point that is frictionally engaged within said small starter hole of said frustum-shaped tip.

3. A manipulation device for use with gloves and an insertion and placement device, comprising:
   a generally flat, thin mounting disk having an upper surface and configured to fit within a finger of said gloves;
   a substantially rigid, tapered, rod-shaped projecting member connected substantially centrally to said upper surface of said mounting disk and extending substantially perpendicularly from said upper surface of said mounting disk, said projecting member having a proximal end fixedly connected to said mounting disk and having a distal end configured to extend through the material of said gloves;
   a generally frustum-shaped tip removably attachable to said distal end of said projecting member, said frustum-shaped tip having a flattened underside and having a flattened top vertex; and
   a delivery wand comprising an exterior cylindrical housing and a moveable plunger slidingly engaged within said exterior cylindrical housing, said plunger comprising a shaft having a distal end and a proximal end, a user interface disposed on said proximal end of said shaft, and a platform having an upper surface, said platform disposed on said distal end of said shaft.

4. The manipulation device for use with gloves and the insertion and placement device, as recited in claim 3, further comprising a weak adhesive disposed on said upper surface of said platform.

5. The manipulation device for use with gloves and the insertion and placement device, as recited in claim 4, wherein said frustum-shaped tip comprises a small dome securely connected to said flattened top vertex of said frustum-shaped tip, wherein said small dome is configured to manipulate small items.

6. The manipulation device for use with gloves and the insertion and placement device, as recited in claim 4, wherein said frustum-shaped tip is configured with a small starter hole disposed substantially centrally on said flattened underside, and wherein said distal end of said projecting member is frictionally engaged within said small starter hole of said frustum-shaped tip.

7. A method of installing a manipulation device into a fingertip of a glove through the material of the glove, comprising:
   obtaining a cylindrical delivery wand comprising an internal plunger and an external cylindrical housing having a proximal end and a distal end, said internal plunger comprising a moveable shaft, a distal platform having an upper surface, and a proximal user interface;
   extending said internal plunger to said distal end of said cylindrical housing;
   placing a generally thin mounting disk on said upper surface of said distal platform, said mounting disk having an upper surface and having a substantially perpendicularly projecting member disposed on said upper surface, said perpendicularly projecting member having an extending end;
   retracting said distal platform with said mounting disk into said cylindrical housing toward said proximal end of said cylindrical housing;

inserting said delivery wand into a first finger of said glove;

positioning said mounting disk within said glove fingertip at a desirable location;

applying pressure to said proximal user interface to thereby extend said internal plunger through said cylindrical housing from nearer said proximal end to nearer said distal end, thereby pushing said extending end of said projecting member through said material of said glove to protrude through said material of said glove;

positioning a frustum-shaped tip over said projecting member;

engaging said projecting member to said frustum-shaped tip;

disengaging said mounting disk from said distal platform; and removing said delivery wand from said glove.

8. The method of installing a manipulation device into a fingertip of a glove through the material of the glove as recited in claim 7, wherein said delivery wand further comprises a weak adhesive disposed on the upper surface of said distal platform, further comprising the steps of:

engaging said mounting disk to said distal platform by using said weak adhesive disposed on said upper surface of said distal platform; and wherein the step of disengaging said mounting disk from said distal platform further comprises the step of separating said mounting disk from said weak adhesive disposed on said upper surface of said distal platform.

9. The method of installing a manipulation device into a fingertip of a glove through the material of the glove as recited in claim 8, wherein said extending end of said projecting member is configured with a tapered point, wherein said frustum-shaped tip has an underside configured with a small starter hole, and wherein the step of engaging said projecting member to said frustum-shaped tip includes the step of inserting said tapered point of said projecting member into said small starter hole of said frustum-shaped tip.

10. The method of installing a manipulation device into a fingertip of a glove through the material of the glove as recited in claim 8, further comprising the step of inserting said delivery wand into a second finger of said glove.

* * * * *